United States Patent [19]

Prehmus et al.

[11] 3,775,551

[45] Nov. 27, 1973

[54] EXPLOSION PROOF ENCLOSURE WITH WITHDRAWABLE ELECTRICAL COMPONENT MOUNTING PANEL

[75] Inventors: George F. Prehmus, Scotia; Richard R. Verch, Elnora, both of N.Y.

[73] Assignee: Environment/One Corporation, Schenectady, N.Y.

[22] Filed: Apr. 13, 1972

[21] Appl. No.: 243,810

[52] U.S. Cl............ 174/52 R, 200/50 AA, 317/120
[51] Int. Cl. .............................................. H05k 5/04
[58] Field of Search...................... 174/50, 52 R, 59; 200/50 AA; 317/99, 101 R, 101 CB, 101 DH, 120

[56] References Cited
UNITED STATES PATENTS

| | | | |
|---|---|---|---|
| 2,734,097 | 2/1956 | Avery................................ | 174/52 R |
| 3,044,655 | 7/1962 | Rebikoff...................... | 174/52 R UX |
| 3,101,388 | 8/1963 | Vogt et al............................ | 174/59 |
| 3,436,775 | 4/1969 | Schlosser et al. .......... | 174/52 R UX |
| 3,573,343 | 4/1971 | De Smidt........................... | 174/52 R |

FOREIGN PATENTS OR APPLICATIONS

| | | | |
|---|---|---|---|
| 382,090 | 10/1932 | Great Britain.................... | 200/48 R |
| 934,412 | 8/1963 | Great Britain..................... | 174/52 R |

Primary Examiner—Laramie E. Askin
Attorney—Charles W. Helzer

[57] ABSTRACT

A low cost explosion proof casing is constructed of standard rearward and forward outer annular pipe flanges and a uniform diameter pipe, together with a movable unit including an electrical component mounting panel having a self aligning rearward end plate secured at one end for sliding movement within the pipe and a forward end plate secured at the forward end of the panel for overlapping the forward flange. Threaded bolts extend through the forward flange and forward end plate; threaded bolts extend through a rearward annular end plate and the rearward flange; and studs in the rearward panel extend through the rearward flange. Axially spaced upper and lower rollers on the panel engage the inner cylindrical surface of the pipe to facilitate partial withdrawal of the movable unit to a maintenance position as determined by stops wherein it is cantilevered forwardly of the forward end of the pipe, so that the weight of the end plates, panel and electrical components is fully carried by the pipe so that only the threaded fasteners or bolts need be removed completely. Complete withdrawal for extensive maintenance or repair is also provided for. One or more such casings may be mounted on a pipe fabricated sled.

17 Claims, 3 Drawing Figures

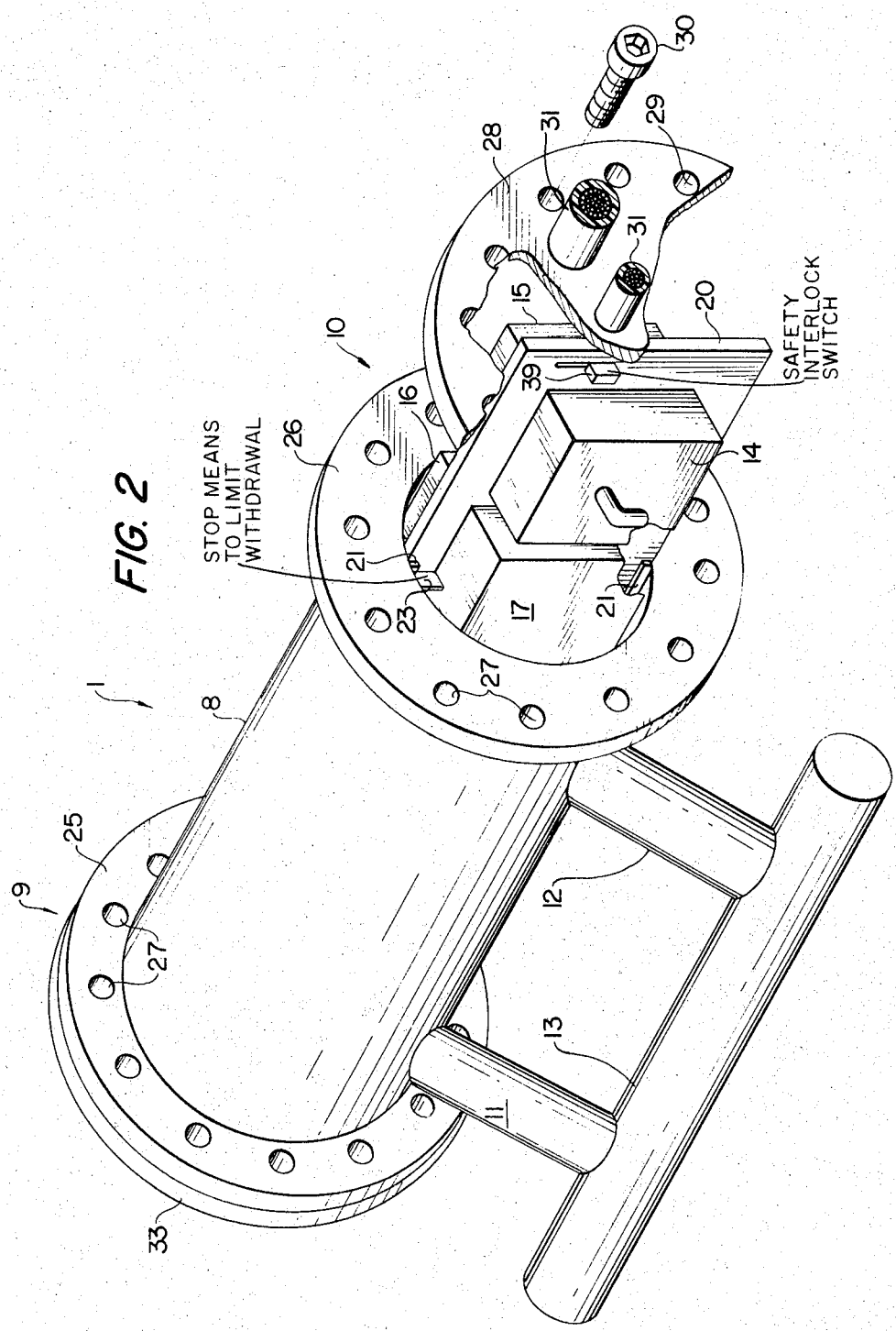

EXPLOSION PROOF ENCLOSURE WITH WITHDRAWABLE ELECTRICAL COMPONENT MOUNTING PANEL

BACKGROUND OF THE INVENTION

Several attempts have been made to construct explosion proof casings for electrical components, with the components mounted on a rack or the like to be slid into and out of a generally cylindrical housing, but these require the complete removal of heavy end plates, special fabrication of the casing with accompanying high cost, and difficulty in removing the electrical component rack for servicing. Such prior art explosion proof casings are shown in the patent to DeSmidt No. 3,573,343, issued Apr. 6, 1971, and the patent to Vogt et al. No. 3,101,388, issued Aug. 20, 1963.

More conventional types of explosion proof casings or containers for electrical control components have been constructed from more readily available and low cost standard steel plate by welding fabrication. However, with this type of welded construction, the labor costs are quite high when compared to the above-mentioned patented structures so that the overall total cost is quite high for all of the above-mentioned explosion proof casings.

SUMMARY OF THE INVENTION

It is an object of the present invention to produce a low cost explosion proof casing by fabrication from standard pipes and standard pipe fittings with a minimum of welding fabrication without requiring the casting or other expensive fabricating techniques or considerable labor of the prior art.

The foregoing is accomplished by providing a casing with a standard pipe length, standard type pipe flanges welded or threaded to its opposite ends, an electrical component mounting panel slidably received within opposed channel shaped members secured to the pipe inner surface and supported on the pipe inner surface by a plurality of upper and lower axially spaced rollers, and end plate means closing the opposite ends. The rearward end plate means includes a self aligning rearward plate secured to the panel for movement therewith slidingly into and out of the pipe, a rearward annular end plate bridging the rearward end plate and rearward flange for connection thereto by threaded fasteners, and connectors for providing of electrical connections therethrough to the components. The forward end plate means includes a forward end plate rigidly secured to the panel and overlying the forward flange for connection thereto by means of threaded fasteners.

One or more such casings may be mounted by bracing to parallel tube or steel pipe skids by welded or bolted fabrication. For maintenance purposes or the like, the forward threaded fasteners and the rearward threaded fasteners between the rearward annular end plate and panel end plate may be removed so that the movable unit comprising the forward and rearward end plates secured to the panel carrying the electrical components may be moved forward on its rollers to a cantilevered position as determined by stop means wherein it is fully supported by the internal surface of the pipe and with the electrical components freely exposed on all sides for maintenance. An interlock switch may be provided to prevent operation of the electrical components in the maintenance position.

BRIEF DESCRIPTION OF THE DRAWING

Further objects, features and advantages of the present invention will become more clear from the following detailed description of the drawing, wherein:

FIG. 2 is a partial exploded view of one of the explosion proof casings, in perspective from the forward end mounted on a separate skid.

DETAILED DESCRIPTION OF THE DRAWING

Figure 1:
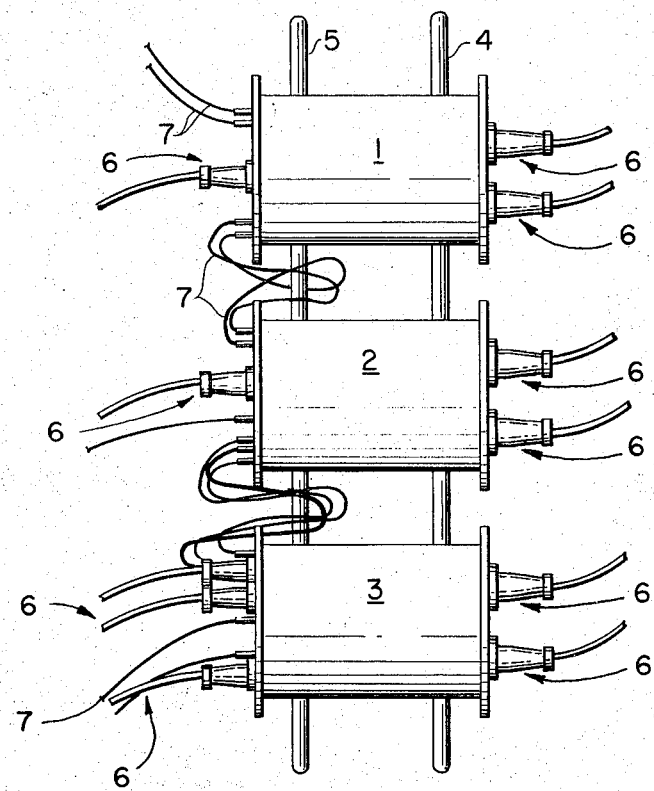
FIG. 1 is a plan view of a sled or skid carrying three explosion proof casings according to the present invention.

As shown in FIG. 1, the explosion proof equipment of the present invention includes a plurality of electrical control containing explosion proof casings 1, 2, 3 mounted parallel to each other on parallel skids 4, 5 that extend transversely to the casings. Although three casings are shown, more or less may be provided on the skids, and if desired, only one casing may be mounted on skids, or any other convenient type of mounting. The skids 4 and 5 are preferably constructed of steel pipe, and their ends may be bent upwardly to facilitate pulling the skids along an uneven surface. A plurality of power cable receptacles extend through respective end walls of the casings, 1, 2, 3 to provide electrical connections with the electrical control components carried therein. At the opposite ends of the casings 1-3, a plurality of electrical wires or cables sealingly extend through the end wall from the electrical components within the casings to the exterior for connection to each other and equipment elsewhere for control thereof. Since the casings 1-3 are identical in structure, except for the electrical components carried therein and the types of power connections 6 and control cables 7, only one will be described and shown in detail in FIGS. 2 and 3.

The casing 1 includes a predetermined cut length of standard pipe 8 having a uniform wall thickness and uniform diameter throughout its axial length from the rearward end 9 to the forward end 10. A plurality of fabricated steel bracing members 11, 12, are welded together as shown, and the pipes 13 form the skid, with it being understood that a mirror image skid is provided on the opposite side of the pipe 8 in FIG. 2, although not shown. This skid is preferably such that a fork lift may enter from either side of the casings perpendicular to the skids or from either end parallel with the skids.

The various electrical control components, such as transformers, circuit breakers, solid state circuit elements, contactors, and the like, 14–19 are usually supportingly mounted on the opposed mounting faces of a panel 20. A feature of this construction is that in those cases in which an electrical component is too large, it can be recessed so that it projects through the panel 20. Similarly, the connectors 6 can be mounted in the center of plate 32 by cutting out part of panel 20.

The panel 20, of one or more connected pieces, is of a length between its opposite end edges substantially equal to the length of the pipe 8, and of a width between its opposite side edges equal to substantially the inner diameter of the pipe 8. These side edges of the panel 20 are respectively guidingly received within opposed diametrically mounted U-shaped channels 21, which are preferably welded to the inner surface of the cylindrical pipe 8 to open toward each other. Preferably, the weight of the panel 20 and the electrical components 14-19 is carried by means of a plurality of bottom rollers 22, which are on opposite sides of the panel 20 and axially spaced, with respect to the axis of the pipe 8, from each other. In this manner, the panel 20 and supported electrical components 14-19 may be slid forward out of the pipe 8 as shown in FIG. 2 to a maintenance end position, further removed than shown in FIG. 2, wherein a stationary stop 23 secured to the pipe 8 will engage a cooperating stop secured to the panel 20, to prevent complete withdrawal of the panel.

In the above-described maintenance end position of the panel, a set of axially opposed rollers 24 will engage the upper inner surface of the pipe 8 at the rearwardmost end of the panel 20, and at least one set of roller 22 will engage the lower inner surface of the pipe 8 axially spaced forward of the rollers 24 so as to be at the forwardmost end of the pipe 8 when the panel stop member engages the stationary stop 23. Thus, this axially spaced pair of upper and lower rollers, with respect to the axis of the pipe 8, will determine the force couple transmitting supports to resist the torque produced by the weight of the thus cantilevered panel 20 and electrical components carried thereby. It is thus seen that the electrical components and panel may be slid from a first end position wholly assembled within the pipe 8 forwardly to a second maintenance end position cantilevered from the pipe 8 with the weight at all times being carried by the pipe 8 so that no heavy components need be supported by operating personnel. Further, it is preferable that the heavier electrical components, such as transformers, be mounted on the lower, rear portions of the panel 20 and the lighter components be mounted on the upper, forward portions of the panel 20 to provide the most desirable center of gravity. Preferably, the panel 20 will be mounted vertically as shown in the drawings and as determined by the position of the channels 21. Also, the electrical components 14-19 will preferably be mounted on the forward portion of the panel 20 that is cantilevered outwardly of the pipe 8 in the maintenance position, with the rearward portion of the panel 20 still within the pipe being empty and serving only support purposes, so that access may be provided to all sides of the electrical components and panel in the cantilevered maintenance end position for replacement, servicing and the like. In the manner of a standard kitchen cabinet type drawer, the panel 20 may be lifted at its forward end and pulled further forward to disengage its bottom roller from the inner surface of the pipe and to drop the rearward end so as to free the stop means and provide for complete removal of the panel for replacement, if desired. A plurality of special purpose panels are thus interchangeably received within the pipe 8.

To seal the opposite ends of the pipe 8 and to provide fixed mountings for the cables 6 and 7, end flanges and end plates connected thereto are provided. A rearward annular metal flange 25 and a forward annular metal flange 26 are connected to the respective opposite ends of the pipe 8, preferably by welding, although these flanges may be threaded thereon. In any event, the flanges 25, 26 may be standard stock flanges with pre-drilled threaded fastener holes 27. For the welded construction, the internal diameter of the flanges 25, 26 is substantially equal to the external diameter of the pipe 8, and the external diameter of the flanges 25, 26 is substantially greater than the external diameter of the pipe 8.

As shown in FIG. 2, an end plate 28, circular in form even though only partially shown, is rigidly secured to the forward end edge of the panel 20. The end plate 28 has a threaded fastener hole pattern 29 corresponding to the holes 27 and the flange 26 and is of a diameter substantially equal to the diameter of the flange 26 for sealing connection therewith, with or without a gasket, by means of a plurality of threaded fasteners 30, only one of which being shown, which may be provided with nuts, or passed through one hole and threaded into the other. Hard wired cables 31, corresponding to cable 7, pass through and are rigidly secured to the end plate 28 for connection at their inner ends to the electrical components 14-19. In this manner, the electrical cables move in and out with the panel 20 and their connections with the end plate 28 and the electrical components are not in any way disturbed by withdrawing the panel to its maintenance end position or by completely removing the panel.

Figure 3:
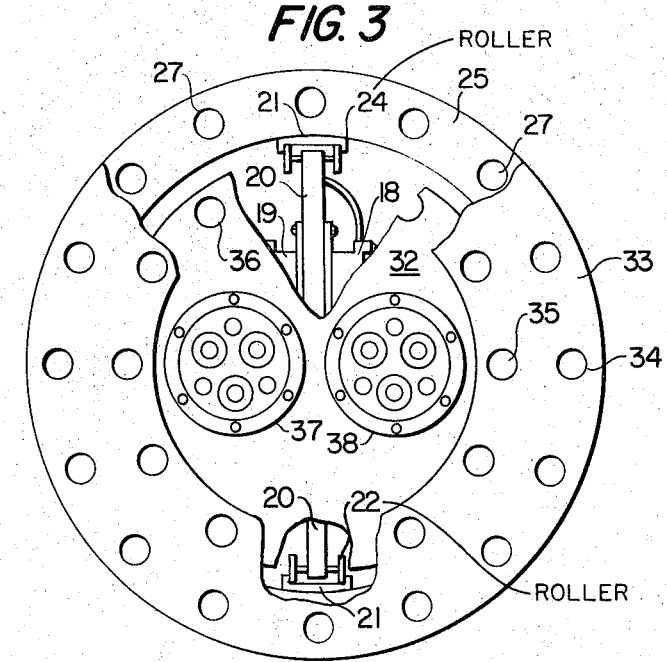
FIG. 3 is a rearward end view of the explosion proof casing, with portions broken away.

As more particularly shown in FIG. 3, the rearward end of the panel 20 is secured to a self aligning rearward end circular plate 32, which has an external diameter substantially less than the internal diameter of the pipe 8 and is provided with a clearance for the channels 21 so that it may be slid, with the panel 20, through the forward end of the pipe 8 rearwardly to its fully assembled rearward end position wherein it is substantially co-planar with the rearward flange 25. Further, flexibility is provided to permit mating of holes. In this fully assembled position, an annular end plate 33 is assembled by means of bolts or the like and bolt hole patterns 34, 35 aligned with the bolt hole patterns 27 and 36 respectively. The mating surfaces of plates 28 and 33 and flanges 26 and 25 are machined to provide a small enough gap when bolted together that they will quench a flame passing between them, thus providing an explosion proof seal, even though water or air can pass through. The enclosure can be made water tight or air tight by tolerance improvement or the inclusion of adequate gaskets. Cables 7, 31 penetrate the end plate 28 by means of an approved commercially available explosion proof sealing device, not shown in detail in the drawing. Further, it is contemplated that the annular end plate 33 and flange 25 may be permanently welded together if desired, or the flange 25 may be eliminated and only the inner half of the annular end plate 33 welded to the pipe 8.

In any event, it is only necessary to remove the threaded fasteners, similar to the fastener 30 of FIG. 2, from the bolt holes 35, 36 to release the rearward end plate 32 and thus the panel 20 for forward sliding movement relative to the pipe 8. It is further seen that the relatively heavy end plates 28, 32, will be wholly supported by the panel 20 and in turn the rollers 22, 24 engaging the inner surface of the pipe 8 in the cantilevered maintenance end position, which is a considerable advantage over the prior art that required the handling of these heavy components by maintenance personnel.

Standard quick coupling explosion proof electrical connectors 37, 38 are provided in the end plates 28 and 32 for electrical connection with appropriate electrical components 14-19 at their inner end and for quick coupling connection with electrical cables connected to motors or other electrical equipment at their outer end. For ordinary maintenance, these connectors or couplings do not have to be disengaged, but are preferably disengaged when it is desired to completely remove the panel 20 from the pipe 8 for replacement.

To prevent electrical shock hazards to maintenance personnel, and to prevent electric sparks which may ignite explosions when servicing the electrical components 14-19 with the panel in the cantilevered end position partially shown in FIG. 2, a safety interlock switch 39 may be mounted on the panel 20, if desired, to engage an appropriate element stationarily mounted with respect to the pipe 8, for example the stationary stop member 23, in the fully assembled position of the panel 20 within the pipe 8. In this manner, the switch 39 will be operated to energize the electrical components only when the panel 20 is fully assembled, with the flanges and end plates sealingly engaging.

Since the construction of the switch 39, electrical components 14-19 and electrical connectors 37, 38 may be conventional and of any type, they will not be described in further detail.

OPERATION

From the above, it is seen that the explosion proof casing of the present invention is entirely constructed of standard type stock steel pipes, pipe flanges and end plates. Such items are predrilled where appropriate and readily available on the open market at low cost due to volume production and may be readily welded together with a minimum amount of labor and skill as above-described. Preferably, the steel pipe 8 is approximately 20 or 24 inches in diameter but the size is not necessarily either of these. The panel 20 may be constructed of any standard panel construction material. Machining of the mating faces of the seal plates, 28 and 33 and the flanges, 25 and 26 is sufficient to provide a flame proof structure.

Access to the electrical components for maintenance purposes is obtained by removing the threaded fasteners 30 from the forward holes 27, 29 and from the rearward holes 35, 36. Thereafter, the workman merely pulls the forward end plate 28 forwardly without supporting any of the accompanying weight so that the panel 20, with the electrical components thereon, moves outwardly from the pipe 8 to completely expose the electrical components in its forwardmost maintenance end position. If it is desired to completely remove the panel 20 for replacement or interchange, the mechanical stop can be removed or released, permitting the entire assembly to roll out. A plurality of interchangeable assembled movable elements comprising desired electrical components, a panel 20 and the rigidly secured opposite end plates 28, 32 may be preassembled in a factory along with the cables and cable connectors that pass through the end plates, stored where desired and freely interchanged in the standard size pipes 8.

The construction costs for the present invention are quite low due to the usage of simple assembly procedures and stock items; the maintenance of the electrical components is quite simple since no heavy components have to be lifted and no electrical connections disturbed; the back-to-back arrangement of the electrical components and the cylindrical construction provides for a light weight package and reduces the length of heavy wire needed. Movement of the casings is facilitated by means of skids and a construction that permits fork lift handling from any side. Access to the electrical components is quite fast in that only a few bolts need to be removed and no heavy components lifted requiring additional personnel; the modular construction permits assembly of the pull out panel with rigidly mounted end plates and cable connectors in a factory and the testing thereof outside of the explosion proof casing or preferably also at the factory; standard casing exteriors and skid mountings may be used for almost any purpose merely by interchanging the standard pull out assemblies.

While a single preferred construction of the present invention has been shown and described in detail, with some modification, further modifications, embodiments and variations are contemplated within the spirit and scope of the present invention as defined by the following claims.

What is claimed is:

1. An explosion proof electrical component enclosure for use in an explosive environment, comprising: a substantially uniform diameter and substantially uniform wall thickness metal pipe having an inner cylindrical surface, and opposite forward and rearward ends; a separate annular metal flange rigidly secured to at least said pipe forward end; electrical component mounting panel means being of generally rectangular configuration with opposite mounting faces, opposed side edges spaced apart a distance generally equal to the inside diameter of said pipe, and opposite end edges spaced apart a distance generally equal to the distance between said pipe opposite ends; said panel means being removably mounted with said pipe; means for mounting a plurality of electrical components on the opposite mounting faces of said panel means; separate end plate means closing the rearward end of said pipe, and separate end plate means closing the forward end of said pipe and radially overlying said annular flange; a plurality of electrical connectors providing electrical current flow through said end plate means to the electrical components mounted on said panel means; and fastener means securely fastening at least the forward one of said end plate means to its flange.

2. The component enclosure of claim 1, including a plurality of roller means mounted on said panel means adjacent the lower side edge thereof for supporting said panel means within said pipe to facilitate sliding said panel axially in and out of said pipe.

3. The component enclosure of claim 2, including stop means on said panel means and said pipe normally preventing complete axial withdrawal of said panel means from said pipe over a predetermined range of relative movement defined by one end working position wherein said panel means is completely assembled within said pipe, and an opposite end maintenance position wherein said panel means is withdrawn forwardly from said pipe for a major portion of its axial length and at least one of said roller means is still supportingly in engagement between said panel means and pipe inner surface.

4. The control unit of claim 3, including further roller means on the upper edge portion of said panel means engaging the inner surface of said pipe and being axially spaced rearward from said at least one roller means in the end maintenance position of said pipe and panel means to provide therewith substantially the sole force couple transmitting supports between said panel means and pipe in the cantilevered end maintenance position of said panel means.

5. The control unit of claim 2, including two channel members mounted in diametrically opposed axially extending positions on the inner surface of said pipe, opening toward each other and receiving therebetween the rollers of said panel means.

6. The control unit of claim 1, including interlock switch means having open and closed electrical contact positions being operatively mounted between the stationary elements of said unit as defined by at least said pipe and flange, and the movable elements of said unit as defined by at least said panel means, electrical components and at least one of said end plate means for being in one of said electrical contact positions only when said panel means is fully assembled within said pipe.

7. The control unit of claim 1, wherein said forward flange has an internal diameter at least as great as the external diameter of said pipe and an external diameter substantially greater than the external diameter of said pipe; the forward one of said closure end plate means being rigidly secured to the forward end of said panel means and having an external diameter substantially equal to the external diameter of said forward flange; and the two mating faces of the forward flange and the closure end plate means sealing sufficiently to prevent the propogation of a flame therebetween when fastened together to form an explosion proof structure.

8. The control unit of claim 7, wherein the rearward one of said end plate means includes an end plate secured to said panel means rearward end and having an external diameter substantially less than the internal diameter of said pipe to freely slide through said pipe from the forward end to the rearward end.

9. The control unit of claim 8, including a rearward annular metal flange secured to the rearward end of said pipe; wherein said rearward end plate means further includes an annular plate having an external diameter substantially equal to the external diameter of the rearward flange and an internal diameter substantially less than the external diameter of said rearward sliding end plate; and said rearward flange, rearward end plate and rearward annular plate have respective mating faces sealing sufficiently to prevent the propogation of a flame therebetween when fastened together.

10. The control unit of claim 9, wherein said fastener means include a plurality of threaded means extending through said forward end plate means and its associated forward flange around their common periphery, a plurality of threaded means extending through said rearward flange and said annular plate around their common periphery, and a plurality of threaded means extending through said annular plate and said rearward sliding end plate around their common periphery.

11. The component enclosure of claim 9, wherein at least some of said electrical connectors are mounted on said rearward end plate providing electrical current flow through said rearward end plate and further being completely within the internal diameter of said annular plate, so that when said panel means and rearward end plate move forwardly from said pipe, the electrical lines leading to said electrical connections may freely pass through the rearward annular plate.

12. The component enclosure of claim 1, including a skid for carrying said pipe comprising: at least two parallel pipe supports parallel to said pipe and in a common plane at least below the outer diameters of said flange and pipe, and brace means rigidly interconnecting said pipe supports and said pipe.

13. The control unit of claim 1, including further fastener means securely fastening said rearward end plate means to the rearward end of said pipe.

14. An explosion proof electrical component enclosure for use in an explosive environment, comprising: a substantially tubular enclosure body having opposite forward and rearward generally open ends; electrical component mounting means having opposite end edges spaced apart a distance generally equal to the distance between said body opposite ends; said mounting means being removably mounted within said body; means for mounting a plurality of electrical components on said mounting means; end plate means closing the rearward end of said body, and end plate means closing the forward end; electrical connector means providing electrical current flow through at least said end plate means to the electrical components mounted on said mounting means; fastener means securely fastening at least the forward one of said end plate means to said body; the forward one of said closure end plate means being rigidly secured to the forward end of said mounting means and transversely overlapping the exterior of the forward end of said body; the two mating faces of said forward end plate means and said body sealing sufficiently to prevent the propogation of a flame therebetween when fastened together to form an explosion proof structure; the rearward one of said end plate means including an end plate secured to said mounting means rearward end and having transverse dimensions substantially less than the corresponding transverse dimensions of the interior of said body to freely slide through said body from the forward end to the rearward end during assembly and from the rearward end to the forward end during disassembly; rearward peripheral flange means secured to the rearward end of said body; said rearward flange means transversely overlapping said rearward end plate means around the end plate means periphery and being to the rear of said rearward end plate means; and said rearward flange means and rearward end plate means having respective mating faces sealing sufficiently to prevent the propogation of a flame therebetween when fastened together, so that both said end plate means and said mounting means may be forwardly withdrawn from said body and provide access to the interior of said body from the rear through said rearward flange means.

15. The component enclosure of claim 14, wherein said fastener means include a plurality of threaded means extending through said forward end plate means and said body around their common periphery, and a plurality of threaded means extending through said rearward flange means and said rearward end plate means around their common periphery.

16. The component enclosure of claim 15, wherein said connector means is mounted on said rearward end plate providing electrical current flow through said rearward end plate and further being completely within the internal periphery of said rearward flange means, so that when said mounting means and rearward end plate means move forwardly from said body the electrical lines leading to said electrical connector means may freely pass through the rear of said body.

17. The component enclosure of claim 14, wherein said connector means is mounted on said rearward end plate providing electrical current flow through said rearward end plate and further being completely within the internal periphery of said rearward flange means, so that when said mounting means and rearward end plate means move forwardly from said body the electrical lines leading to said electrical connector means may freely pass through the rear of said body.

* * * * *